United States Patent Office 2,729,675
Patented Jan. 3, 1956

2,729,675

METHOD OF PREPARING MERCAPTOSUCCINIC ACID

Frank M. Cowen, Norwalk, Conn., assignor to American Cyanamid Company, New York, N. Y., a corporation of Maine No Drawing. Application December 11, 1952,
Serial No. 325,440

4 Claims. (Cl. 260—537)

The present invention relates to the preparation of mercaptosuccinic acid.

Known methods of preparing mercaptosuccinic acid involve reactions in which considerable quantities of by-products are formed and in which difficulty is encountered in their separation. For example, in the production of mercaptosuccinic acid by reacting an alkali metal sulfide with monobromosuccinic acid in an aqueous medium, an appreciable amount of thiodisuccinic acid is formed.

The principal object of the present invention is to provide mercaptosuccinic acid of high purity. Another important object is the provision of an economical method for the preparation of mercaptosuccinic acid in good yields.

These and other objects may be attained by the hydrolysis of an O,O-dialkyl dithiophosphatosuccinic anhydride, said hydrolysis being carried out by heating the latter in the presence of water at a temperature sufficient to cause evolution of hydrogen sulfide.

The hydrolysis of an O,O-dialkyl dithiophosphatosuccinic anhydride to mercaptosuccinic acid is usually effected at a temperature within the range of from about 85° to 110° C. Somewhat higher temperatures and also pressures above atmospheric may be employed depending upon the type of dithiophosphatosuccinic anhydride utilized.

A typical example in which O,O-diethyl dithiophosphatosuccinic anhydride is hydrolyzed to mercaptosuccinic acid may be illustrated as follows:

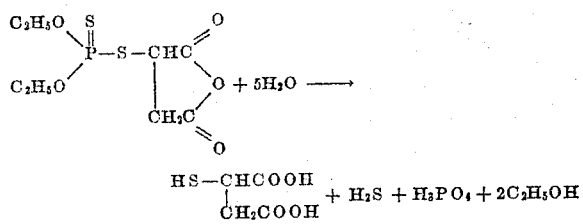

An O,O-dialkyl dithiophosphatosuccinic anhydride may be prepared by reacting together equimolar quantities of maleic anhydride and an O,O-dialkyl dithiophosphoric acid. The reaction takes place readily and is usually effected at a temperature within the range of from about 40° to 100° C. The condensation of O,O-diethyl dithiophosphoric acid with maleic anhydride may be illustrated as follows:

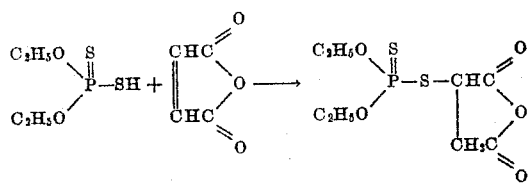

While it has been found that the hydrolysis of an O,O-dialkyl dithiophosphatosuccinic anhydride may be effected either in the presence or absence of a mineral acid such as, for example, hydrochloric, sulfuric, or phosphoric acid, the use of the mineral acid may sometimes be advantageous, particularly when working with large quantities of the reactants, namely water and the dithiophosphatosuccinic anhydride.

The invention is further illustrated, but not limited, by the following examples:

Example 1

A mixture consisting of 218 g. of O,O-diethyl dithiophosphoric acid (94% purity) and 98 g. of maleic anhydride was stirred and heated to 60° C. The exothermic reaction raised the temperature to 75° C. After standing overnight at room temperature, 60 g. of the brown liquid product (O,O-diethyl dithiophosphatosuccinic anhydride) was mixed with 200 cc. of water and 20 g. of conc. hydrochloric acid in a 500 cc. flask equipped with a reflux condenser, stirrer and thermometer. The mixture was heated at reflux (approximately 97.5° C.) with stirring for seven hours. At the end of this period the hydrogen sulfide evolution had ceased. The slightly cloudy solution was cooled to room temperature, treated with "Norit" (decolorizing charcoal), and filtered. The clear, colorless solution was evaporated to a volume of 75 cc. and cooled to room temperature. The white crystals were removed by filtration, washed with a minimum of ice-cold water, and dried to give 19 g. of product. The combined filtrate and washings were then evaporated to a volume of 65 cc. and cooled in an ice-bath. Filtration of the formed crystals, washing and drying as before gave an additional 6 g. of product for a total yield of 25 g. (83% of theory) of mercaptosuccinic acid. After recrystallization from an ethyl acetate-hexane mixture (two parts of ethyl acetate and one part of hexane), the small white needle-shaped crystals melted at 157–158° C.

Anal. Calc'd. for $C_4H_6O_4S$; S, 21.36. Found: S, 20.8.

Example 2

A mixture consisting of 150 g. of O,O-diethyl dithiophosphatosuccinic anhydride and 150 g. of water was heated under reflux with stirring for ten hours. At the end of this period the evolution of hydrogen sulfide had ceased. The product was concentrated on a steam bath and, after cooling to room temperature, the white crystals of mercaptosuccinic acid were filtered with suction, pressed free of mother liquor, and washed with small quantities of ice water. After drying at 100–110° C., the white crystalline product weighed 49 g.

The preparation of mercaptosuccinic acid may be similarly effected, the O,O-diethyl dithiophatosuccinic anhydride of the above examples being replaced by other O,O-dialkyl dithiophosphatosuccinic anhydrides.

The present invention provides a simple, economical method of preparing mercaptosuccinic acid in good yields and high purity. The product is a stable, mild reducing agent and may be of interest as a hair-waving material and in other applications where a non-odoriferous, mild reducing agent is necessary or desirable. Mercaptosuccinic acid is also useful as an intermediate in the production of surface-active agents, pharmaceuticals and synthetic resins.

While the invention has been described with particular reference to specific embodiments, it is to be understood that it is not to be limited thereto but is to be construed broadly and restricted solely by the scope of the appended claims.

I claim:

1. A method for the preparation of mercaptosuccinic acid which includes the step of heating an O,O-dialkyl dithiophosphatosuccinic anhydride in the presence of water at a temperature sufficient to cause evolution of hydrogen sulfide.

2. The method of claim 1 in which the temperature is within the range of from about 85° to 110° C.

3. The method which comprises heating an O,O-dialkyl dithiophosphatosuccinic anhydride in the presence of water until the evolution of hydrogen sulfide substantially ceases, and recovering mercaptosuccinic acid from the reaction product.

4. The method which comprises heating O,O-diethyl dithiophosphatosuccinic anhydride in the presence of water at a temperature sufficient to cause evolution of hydrogen sulfide, and recovering mercaptosuccinic acid from the reaction product.

References Cited in the file of this patent

Billman: Liebigs Ann. vol. 339, page 371 (1905).
Holmberg et al.: Chem. Abstracts, vol. 35, column 2113–4 (1941).
Holmberg et al.: Chem. Abstracts, vol. 44, column 4423 (1950).